(12) United States Patent
Jin

(10) Patent No.: US 10,972,957 B2
(45) Date of Patent: Apr. 6, 2021

(54) METHOD AND DEVICE FOR ROUTING DATA IN 6TISCH NETWORKS

(71) Applicant: Kabushiki Kaisha Toshiba, Minato-ku (JP)

(72) Inventor: Yichao Jin, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 16 days.

(21) Appl. No.: 16/183,110

(22) Filed: Nov. 7, 2018

(65) Prior Publication Data
US 2020/0145897 A1    May 7, 2020

(51) Int. Cl.
*H04W 40/14* (2009.01)
*H04L 29/08* (2006.01)
*H04W 84/18* (2009.01)

(52) U.S. Cl.
CPC ............. *H04W 40/14* (2013.01); *H04L 67/12* (2013.01); *H04W 84/18* (2013.01)

(58) Field of Classification Search
CPC .................................................... H04W 40/14
See application file for complete search history.

(56) References Cited

U.S. PATENT DOCUMENTS

| | | | |
|---|---|---|---|
| 7,535,877 B2 * | 5/2009 | Wang | H04W 52/322 370/337 |
| 9,705,737 B2 | 7/2017 | Wetterwald et al. | |
| 2010/0061272 A1 * | 3/2010 | Veillette | H04L 45/34 370/254 |
| 2010/0260146 A1 * | 10/2010 | Lu | H04L 12/4633 370/331 |
| 2015/0023205 A1 | 1/2015 | Vasseur et al. | |
| 2016/0021011 A1 * | 1/2016 | Vasseur | H04L 47/127 370/235 |
| 2016/0182306 A1 * | 6/2016 | Liu | H04W 84/18 370/255 |
| 2017/0093663 A1 * | 3/2017 | Douglas | H04L 41/142 |
| 2018/0035442 A1 | 2/2018 | Jin | |
| 2018/0176853 A1 | 6/2018 | Chen et al. | |

(Continued)

OTHER PUBLICATIONS

"IPv6 over the TSCH mode of IEEE 802.15.4e", charter-ietf-6tisch-01-00, 2015. Retrievable at https://datatracker.ietf.org/doc/charter-ietf-6tisch/01-00/.

(Continued)

*Primary Examiner* — John D Blanton
(74) *Attorney, Agent, or Firm* — Oblon, McClelland, Maier & Neustadt, L.L.P.

(57) ABSTRACT

A method of selecting a parent node for routing from among a plurality of nodes in a 6TiSCH network. The method comprises; each of a two or more nodes of the plurality of nodes transmitting a routing message at each power level of a plurality of power levels, wherein the routing message comprises an indication of the reliability for a transmission path to a root node. The method further comprises, at a deciding node, receiving said routing messages from said two or more nodes, determining respective likelihoods of reliability of transmission to a root node via each of said two or more nodes based on the received messages and the indications, and selecting, as the parent node from the two or more nodes the node which has the greatest likelihood of reliability of transmission.

10 Claims, 13 Drawing Sheets

(56) References Cited

U.S. PATENT DOCUMENTS

| | | | |
|---|---|---|---|
| 2018/0184360 A1* | 6/2018 | Cavalcanti | H04W 52/0261 |
| 2018/0302911 A1 | 10/2018 | Aijaz et al. | |
| 2019/0159201 A1 | 5/2019 | Jin | |
| 2019/0174389 A1* | 6/2019 | Kamp | H04L 1/08 |

OTHER PUBLICATIONS

Kim, A. N. et al., "When HART goes wireless: Understanding and implementing the WirelessHART standard," 2008 IEEE International Conference on Emerging Technologies and Factory Automation, 2008, pp. 899-907, doi: 10.1109/ETFA.2008.4638503.

Palattella, M. R. et al., "On Optimal Scheduling in Duty-Cycled Industrial IoT Applications Using IEEE802.15.4e TSCH," in IEEE Sensors Journal, vol. 13, No. 10, Oct. 2013, pp. 3655-3666, doi: 10.1109/JSEN.2013.2266417.

Accettura, A. et al., "Decentralized Traffic Aware Scheduling in 6TiSCH Networks: Design and Experimental Evaluation," in IEEE Internet of Things Journal, vol. 2, No. 6, Dec. 2015, pp. 455-470 doi: 10.1109/JIOT.2015.2476915.

"6TiSCH 6top Scheduling Function Zero (SF0), draft-ietf-6tisch-6top-sf0-05", Luxembourg Institute of Science and Technology (LIST), Jul. 2, 2017.

Dujovne,D. et al., "6TiSCH: deterministic IP-enabled industrial internet (of things)," in IEEE Communications Magazine, vol. 52, No. 12, Dec. 2014, pp. 36-41, doi: 10.1109/MCOM.2014.6979984.

Jin, Y. et al., "A centralized scheduling algorithm for IEEE 802.15.4e TSCH based industrial low power wireless networks." 2016 IEEE Wireless Communications and Networking Conference, 2016, pp. 1-8, doi: 10-1109/WCNC.2016.7565002.

Duquennoy, S. et al., "Orchestra: Robust Mesh Networks Through Autonomously Scheduled TSCH." ResearchGate, Nov. 2105, doi: 10.1145/2809695.2809714.

Winter, T., et al., "RPL: IPv6 Routing Protocol for Low-Power and Lossy Networks", Internet Engineering Task Force (IETF), Request for Comments: 6550, Mar. 2012.

Thubert, P. et al., "Objective Function Zero for the Routing Protocol for Low-Power and Lossy Networks (RPL)", Internet Engineering Task Force (IETF), Request for Comments: 6552, Mar. 2012.

Narayanaswamy, S. et al., "Power Control in Ad-Hoc Networks: Theory, Architecture, Algorithm and Implementation of the COMPOW Protocol", Proc. of the European Wireless Conf. 2002.

Farahani, S., "ZigBee Wireless Newtorks and Transceivers", Newnes, 2008.

* cited by examiner

| Parent ID | PRI | RPL rank | Preference |
|---|---|---|---|
| A | 0 | 300 | 1 |
| B | 0 | 400 | 2 |
| C | 2 | 200 | 4 |
| D | 1 | 300 | 3 |

US 10,972,957 B2

METHOD AND DEVICE FOR ROUTING DATA IN 6TISCH NETWORKS

FIELD

Embodiments described herein relate generally to methods and devices for communicating in 6TiSCH networks.

BACKGROUND

Monitoring and controlling industrial processes has typically been seen as an expensive activity due to the vast number of sensors which are often expensive to install, operate and maintain especially where a wired network is required to facilitate the exchange of communications. In recent times significant advances have occurred in the field of wireless sensor networks, in particular relating to the Internet of Things (IoT), which offer the possibility for low cost, high flexibility sensor networks.

While it is clearly advantageous to use low cost wireless sensors for industrial monitoring; it is not without its challenges. These challenges include the harsh operating conditions created by the presence of large pieces of metallic equipment as well as the stringent reliability and security requirements that are required for operation in an industrial environment.

The latest Internet Engineering Task Force (IETF) 6TiSCH (IPv6 over Time Synchronized Channel Hopping (TSCH) MAC) standard is considered by many to be the de-facto standard for wireless sensors with industrial applications and facilitates high reliability, low latency connections for low power IoT devices.

In keeping with 6TiSCH's predecessor (IEEE 802.15.4e), the routing protocol for low-power and lossy networks, known as RPL, has been adopted in the standard. Routing packets in IoT sensor networks can be particularly challenging due to the presence of power constrained devices, lossy radio links and the ever-changing nature of the network topology. Despite the considerable amount of work undertaken by the Internet Engineering Task Force, there remain instances where the RPL routing protocol determines a sub-optimal routing topology for achieving reliable communications. For this reason a new approach to routing packets in a low power lossy network is required.

Arrangements of the present invention will be understood and appreciated more fully from the following detailed description, made by way of example only and taken in conjunction with drawings in which.

DETAILED DESCRIPTION

Figure 1:
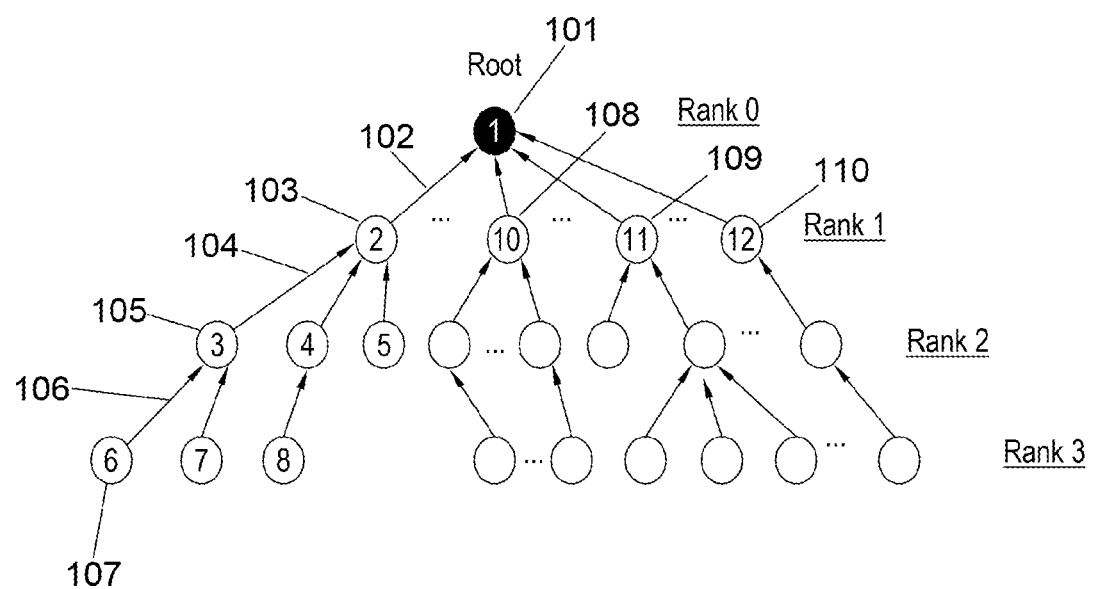
FIG. 1 shows an exemplary Destination Orientated Directed Acrylic Graph (DODAG)

According to an embodiment there is provided a method of selecting a parent node for routing from among a plurality of nodes in a 6TiSCH network. The method comprises each of a two or more nodes of the plurality of nodes transmitting a routing message at each power level of a plurality of power levels, wherein the routing message comprises an indication of the reliability for a transmission path to a root node. The method further comprises, at a deciding node, receiving said routing messages from said two or more nodes, determining respective likelihoods of reliability of transmission to a root node via each of said two or more nodes based on the received messages and the indications and selecting, as the parent node from the two or more nodes the node which has the greatest likelihood of reliability of transmission.

According to another embodiment there is provided a method of selecting a parent node from a plurality of nodes in a 6TiSCH network. The method comprises receiving a plurality of routing messages from a plurality of neighbouring nodes, determining a likelihood of reliability of transmission to a root node via a neighbouring node of the plurality of neighbouring nodes and selecting, as the parent node from the plurality of neighbouring nodes the node which has the greatest likelihood of reliability.

The 6TiSCH network may be any network which uses an RPL based routing protocol.

The 6TiSCH network may be IPv6 over IEEE 802.15.4e TSCH mode as standardised by the Internet Engineering Task Force (IETF).

The routing related messages may be DIO messages.

The transmission path with the greatest likelihood of reliability may be the transmission path which can be traversed using the smallest number of high power routing related messages.

In the case of two power levels, a high power routing related message may be a full power message. In the case of more than two power levels, the number of high power routing related messages may be a weighted summation of each non-minimal power routing related message, wherein the weighting increases as the power level increases.

Selecting the parent node from the plurality of neighbouring nodes may further comprise comparing a priority routing index received in the plurality of routing messages and selecting the node which transmits the lowest priority routing index wherein the priority routing index indicates the number of high power hops in a transmission path to the root node.

The priority routing index (PRI) may be contained within the header of the routing related messages.

The priority routing index may be calculated by adding an increment to the priority routing index of the parent node wherein the increment is different for each power level of the plurality of power levels.

Selecting a parent node from the plurality of neighbouring nodes may further comprise selecting amongst the plurality of neighbouring nodes based on a RPL rank when two or more nodes have the same priority routing index.

The method of selecting the parent node may further comprises transmitting a non-routing related message to the parent node at a maximum allowed power level irrespective of the power of a received routing message.

The method of selecting the parent node may further comprise completing a three-way handshake comprising a DIO message, a DAO message and a DAO-ACK message between the first node and a node of the plurality of nodes.

According to another embodiment there is provided a method of transmitting a routing message in a 6TiSCH network. The method comprises transmitting a routing message at each power level of a plurality of power levels wherein the routing message comprises an indication of the reliability for a transmission path to a root node.

The plurality of transmit power levels may comprise a maximum allowed power level and a reduced power level that is less than the maximum allowed power level The method of transmitting a routing message may further comprises transmitting a routing message at each power level of a plurality of power levels further comprises transmitting the routing message in order of increasing power level.

The method may start transmitting routing related messages at the lowest allowable power level. By forming a routing topology at a minimum power level the method discussed herein can immediately discount higher power level paths without wasting energy forming a topology based on high power messages only to reform another topology based on the received low power messages.

The method may transmit routing related messages at the same or different intervals.

According to another embodiment there is provided a non-transitory medium comprising computer program instructions suitable for execution by a processor, the instructions configured to, when executed by the processor, perform a method of selecting a parent node from a plurality of nodes in a 6TiSCH network. The method comprising: receiving a plurality of routing messages from a plurality of neighbouring nodes, determining a likelihood of reliability of transmission to a root node via a neighbouring node of the plurality of neighbouring nodes and selecting, as the parent node from the plurality of neighbouring nodes the node which has the greatest likelihood of reliability.

According to another embodiment there is provided a non-transitory medium comprising computer program instructions suitable for execution by a processor, the instructions configured to, when executed by the processor, perform a method of transmitting a routing message in a 6TiSCH network. The method comprising transmitting a routing message at each power level of a plurality of power levels wherein the routing message comprises an indication of the reliability for a transmission path to a root node.

According to another embodiment these is provided a 6TiSCH network comprising a plurality of nodes wherein a parent node for routing is selected from among the plurality of nodes by each of a two or more nodes of the plurality of nodes transmitting a routing message at each power level of a plurality of power levels, wherein the routing message comprises an indication of the reliability for a transmission path to a root node. The parent node for routing is further selected by, at a deciding node, receiving said routing messages from said two or more nodes, determining respective likelihoods of reliability of transmission to a root node via each of said two or more nodes based on the received messages and the indications, and selecting, as the parent node from the two or more nodes the node which has the greatest likelihood of reliability of transmission.

According to another embodiment there is provided a device comprising a processor and memory, the memory storing computer program instructions executable by the processor and when executed by the processor causing the processor to select a parent node from a plurality of nodes in a 6TiSCH network. The computer program instructions configured to cause the processor to receive a plurality of routing messages from a plurality of neighbouring nodes, determine a likelihood of reliability of transmission to a root node via a neighbouring node of the plurality of neighbouring nodes and select as the parent node from the plurality of neighbouring nodes the node which has the greatest likelihood of reliability.

The transmission path with the greatest likelihood of reliability may be the transmission path which can be traversed using the smallest number of high power routing related messages.

The device may also comprise computer program instructions which are further configured to cause the processor to select the parent node from the plurality of neighbouring nodes by comparing a priority routing index received in the plurality of routing messages and selecting the node which transmits the lowest priority routing index wherein the priority routing index indicates the number of high power hops in a transmission path to the root node.

The priority routing index may be calculated by adding an increment to the priority routing index of the parent node and wherein the increment is different for each power level of the plurality of power levels.

The device may also comprise computer program instructions which are further configured to cause the processor to select a parent node from the plurality of neighbouring nodes further comprises selecting amongst the plurality of neighbouring nodes based on a RPL rank when two or more nodes have the same priority routing index.

The device may also comprise computer program instructions which further configured to cause the processor to transmit a non-routing related message to the parent node wherein the non-routing related message is transmitted at a maximum allowed power level irrespective of the power of a received routing message.

According to another embodiment there is provided a device comprising a processor and memory, the memory storing computer program instructions executable by the processor and when executed by the processor causing the processor to transmit a routing message in a 6TiSCH network. The computer program instructions configured to cause the processor to: transmit a routing message at each power level of a plurality of power levels wherein the routing message comprises an indication of the reliability for a transmission path to a root node.

Transmitting a routing message at each power level of a plurality of power levels may further comprise transmitting the routing message in order of increasing power level.

Wireless sensor networks are formed from multiple sensor nodes, with each sensor node possessing processing, communication and sensing capabilities. These sensor nodes are routinely used in a range of applications including, but not limited to, industrial monitoring, building automation, health-care, environmental monitoring, and asset tracking.

Low power and lossy networks (LLNs) are a type of wireless sensor network in which the nodes are highly resource constrained and the communication link is highly variable. In a low power and lossy network the sensor nodes are typically limited in terms of processing power, battery and/or memory and are likely to be operating in a highly variable wireless environment with low data and packet delivery rates.

IEEE 802.15.4 is a communications standard which has been specifically designed with low-rate wireless personal area networks in mind. Despite being intended for low-rate wireless networks IEEE 802.15.4 possesses a number of limitations which prevent its wide scale adoption in industrial settings. These limitations include its low reliability and the absence of any interference or fading protection, thereby making it unsuitable for many industrial applications.

More recently, the IEEE have released an extension to IEEE 802.15.4, IEEE 802.15.4e which introduces a number of enhancements to the medium access control (MAC) layer of the original standard in order to overcome these limitations. One addition of particular interest is Time Slotted Channel Hopping (TSCH).

Time Slotted Channel Hopping (TSCH) will be discussed in more detail later in the description however in essence Time Slotted Channel Hopping is a medium access control technique that uses time synchronisation in order to achieve low-power scheduling and uses channel hopping in order to achieve high reliability. As a result of its increased reliability and resilience to multipath fading Time Slotted Channel Hopping (TSCH) is widely becoming the communications standard of choice for industrial sensor deployments, or more generally, Internet of Things (IoT) networks.

With this in mind the IETF has created IETF 6TiSCH (IPv6 over IEEE 802.15.4e TSCH mode) which aims to bridge the gap between an IP-enabled upper protocol stack (i.e. IPv6) and an underlying TSCH-based link layer.

As previously discussed, Low-power and Lossy Networks (LLNs) consist largely of constrained nodes with limited energy, memory and processing power. These nodes are interconnected by lossy links, typically supporting only low data rates with relatively low packet delivery rates. As a consequence of these conditions and limitations; routing in a low power lossy network can be particularly challenging.

In order to address these issues a routing protocol for LLNs, known as RPL, has been developed. This routing protocol is known in the art and is adopted in the 6TiSCH standard.

Unlike wired networks where the routing topology is imposed by the physical wires, low power and lossy networks do not typically have predefined topologies. As a result, the routing protocol RPL has to discover links and maintain a routing topology itself. In 6TiSCH the network topology is arranged in a tree-link structure and is optimised for communications to and from a single point, known as the root node. Consequently RPL organizes the routing topology as a Destination-Orientated Directed Acyclic Graph (DODAG).

A DODAG is a type of Directed Acrylic Graph (DAG). As known in the art, a Directed Acrylic Graph (DAG) is a type of graph where no cycles exist (i.e. there is no sequence of paths from a node that eventually loop back to the same node). The DODAG is a type of Directed Acrylic Graph (DAG) that is rooted at a single node; the root node. The root node is a node at which all paths terminate, i.e. it is a node of the DODAG that has no outgoing paths or edges.

FIG. 1 shows an exemplary Destination Orientated Directed Acrylic Graph (DODAG). FIG. 1 shows a routing topology comprising a root node 101 and a plurality of other nodes; 103, 105 and 107. Each edge (e.g. 102, 104, 106) of the DODAG represents a communication link between two nodes of the DODAG which are configured in a parent-child relationship, for example, FIG. 1 shows node 105 is the child of node 103 and the parent to node 107. Node 107 is known as a leaf node since it only has outgoing edges (i.e. it is not a parent to any other nodes).

The nodes of the DODAG shown in FIG. 1 are arranged according to the rank of each node. A node's rank indicates the node's position in the routing topology relative to the root node. The rank of a node increases as edges (102, 104, 106) are traversed in the direction away from the root node. The rank of a node is computed in accordance with the routing protocols Objective Function (OF). The objective function will be discussed in more detail later in the application however, in essence, the objective function describes how parents in the DODAG are selected and therefore how the network topology is formed.

Figure 2A:
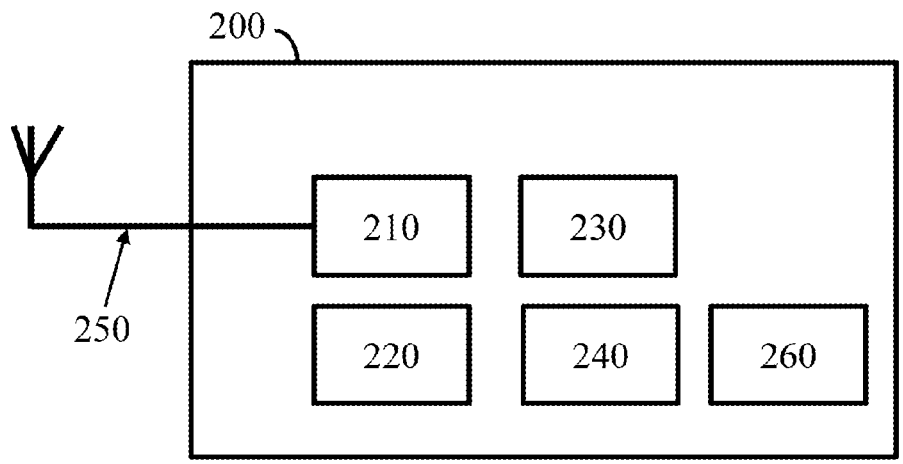
FIG. 2A shows a device 200 which forms a node of the sensor network according to an embodiment.

FIG. 2A shows a device 200 which forms a node of the sensor network according to an embodiment. The device 200 comprises an input/output module 210, a microprocessor 220, a non-volatile memory 230 and a sensor module 240. The input/output module 210 is communicatively connected to an antenna 250. The antenna 250 is configured to receive signals from, and transmit signals to, other nodes in the sensor network. The microprocessor 220 is coupled to the input/output module 210 and to the non-volatile memory 230. The non-volatile memory 230 stores computer program instructions that, when executed, cause the processor 220 to execute program steps that implement the methods described herein. The processor 220 is also coupled to the sensor module 240 that is configured to generate information for transmission across the network including, but not limited to, measurements of an industrial process and changes in an environment within which the device 200 operates. Alternatively or additionally to the sensor module 240, the device 200 can contain an actuator module 260. The actuator module 260 is coupled to the microprocessor 220 and is configured to move or control a mechanism external to the device 200.

In one embodiment the device 200 is configured to operate in accordance with the IETF 6TiSCH (IPv6 over IEEE 802.15.4e TSCH mode) standard. In another embodiment the device 200 is configured to operate in accordance with any networking stack that uses RPL as a routing protocol.

Whilst in the embodiment described above the antenna 250 is shown to be situated outside of, but connected to, the device 200 it will be appreciated that in other embodiments the antenna 250 forms part of the device 200.

Figure 2B:
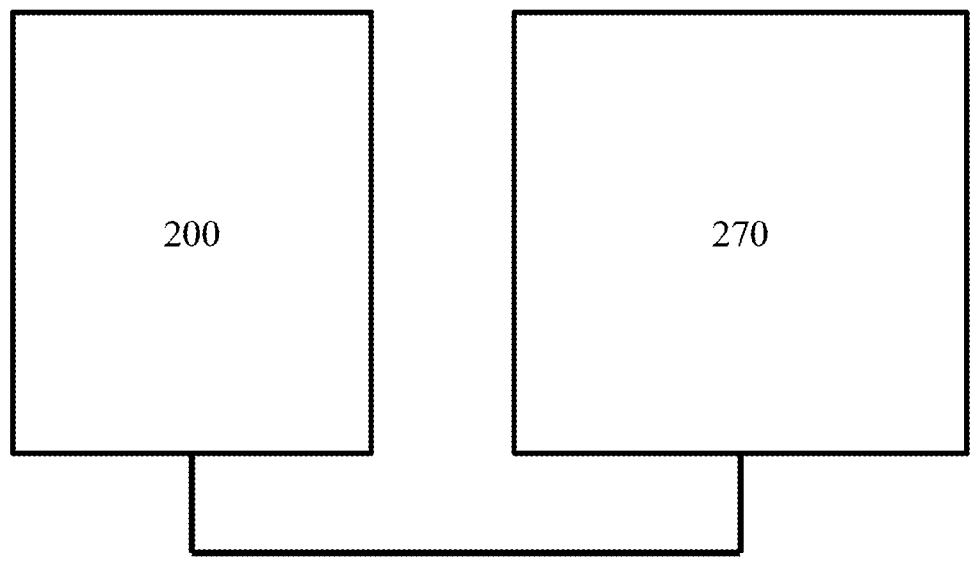
FIG. 2B shows a system comprising the device 200, communicatively connected to a computing system 270.

FIG. 2B shows a system comprising the device 200, communicatively connected to a computing system 270. In an embodiment the connection between the two systems is established via an additional output port (not shown) of the device 200. The computing system 270 may, in one embodiment, be part of an industrial control system, with the device 200 acting as a root node for a network of sensors that generate data concerning an industrial process. By determining a network topology using the methods described herein the computing system 270 can more reliably receive data from the sensor network, there enabling greater control of the industrial process.

In one embodiment the device 200 is a sensor node in a sensor network for monitoring an industrial process. The sensor node may be configured to perform any number of functions including, but not limited to, quality control, predictive machinery maintenance and factory safety. Taking quality control as an example; the sensor module 240 may contain a camera that is capable of in-process inspection for quality control, thereby allowing the manufacturer to identify and resolve failures. In one embodiment, the sensor measurements are communicated to another sensor or machine in the sensor network which is capable of acting on this information, for example by displaying these measurements to a human operator of the industrial control system for interpretation.

Other uses outside of an industrial process are of course also possible. In fact, the methods and devices that are described herein can relate generally to any application of sensor technology, in particular to the Internet of Things (IoT), or more generally, to any wireless sensor network deployment comprising resource constrained sensors. For example, the methods and devices discussed herein could also be used in the healthcare sector where sensors are used for monitoring patient vitals.

Furthermore, despite the following description referring to sensor nodes, it is emphasized that the methods and devices discussed herein relate to any type of node that has an application in the Internet of Things (IoT) including sensor nodes, actuator nodes and nodes which are intended for relaying or processing data without any sensor or actuator capabilities.

Although full details of the known IPv6 Routing Protocol for Low-Power and Lossy Networks (RPL) are available in the Internet Engineering Task Force (IETF) Request for Comments: 6550 which is incorporated herein by reference, the pertinent aspects of the prior art routing protocol, RPL, will be discussed below to enable comparison with the new approach to routing disclosed herein.

RPL defines three control messages for use in the formation of a routing topology:

A Directed Acyclic Graph Information Objection (DIO) message. DIO messages carry information that allows a node to discover an RPL topology, learn its configuration parameters and select a parent from the DODAG;

A Directed Acyclic Graph Information Solicitation (DIS) message. DIS messages are used to solicit DIO messages from an RPL node, in essence a DIS message is used to discovery neighbours that are part of the DODAG; and A Destination Advertisement Object (DAO) message. DAO messages are used to propagate destination information upwards along the edges of the DODAG towards the root node.

Figure 3:
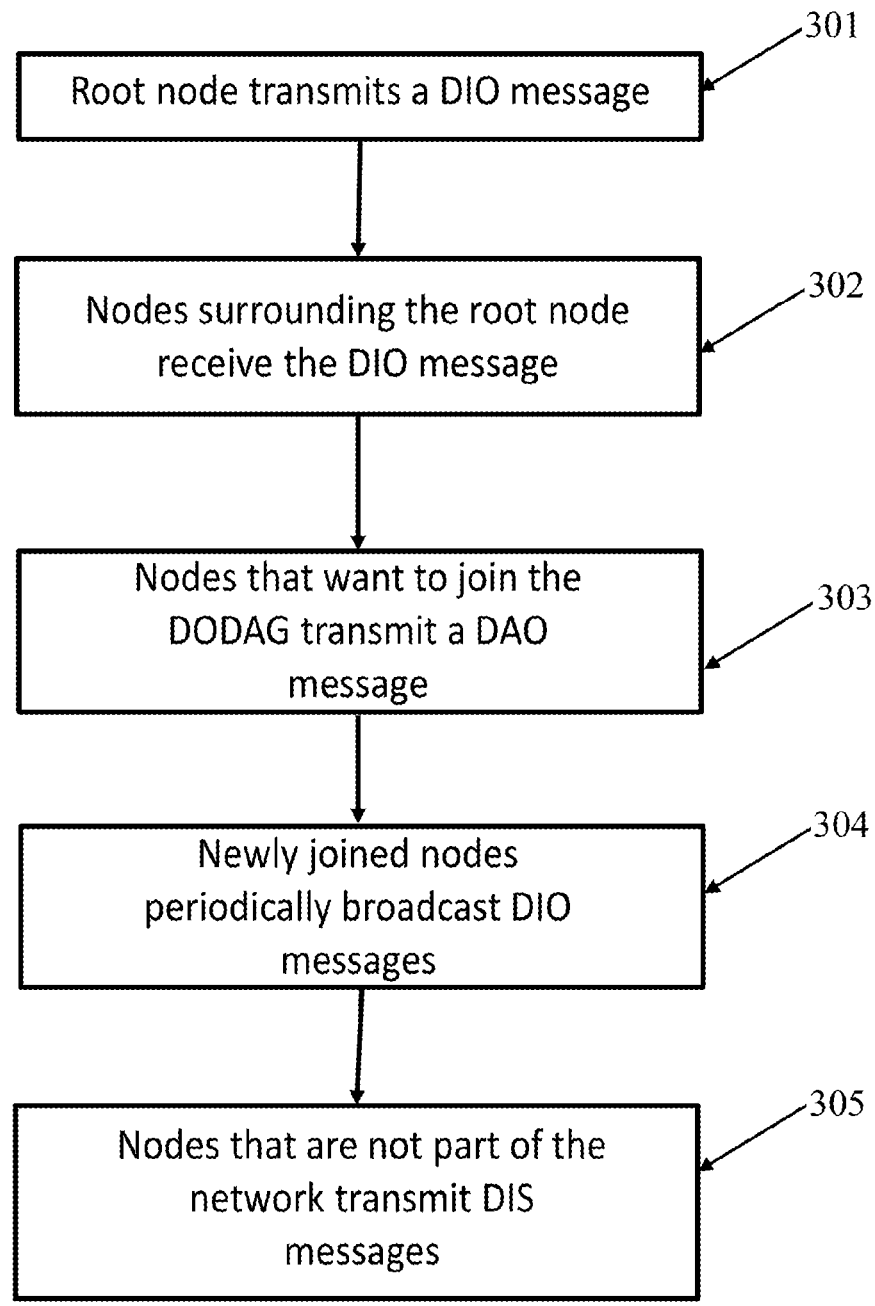
FIG. 3 shows a simplified example of a DODAG building process.

FIG. 3 shows a simplified example of a DODAG building process. The representation of the DODAG shown in FIG. 1 will also be used to explain the DODAG building process. FIG. 3 begins in step 301 with the root node 101 transmitting a DIO message. The DIO message is broadcast in order to advertise the DODAG to neighbouring sensor nodes and contains, amongst other things; the RPL Instance ID, the version number of the DODAG and the rank of the node transmitting the DIO message. In the case where a DIO message is transmitted by the root node, the rank will be zero by definition.

In step 302, nodes surrounding the root node receive the DIO message. In the representation of the DODAG shown in FIG. 1, only nodes 102, 108, 109 and 110 are within the range of the root node 101 and therefore only these nodes are able to receive the DIO message and ultimately join the DODAG. After receiving a DIO message from the root node 101, nodes 102, 108, 109 and 110 can join the network by adding the sender of the DIO message as a parent node.

In order to minimise the size of routing tables, RPL does not by default store a path from the root node to sensor nodes of the network. This can be problematic in situations where the root node needs to communicate with a sensor node. In order to address this RPL includes DAO messages. DAO messages are transmitted by a sensor node and are sent to the root node which records the path from the sensor node to the root node.

In step 303, nodes that want to join the DODAG transmit a DAO message. In the DODAG representation of FIG. 1, nodes 102, 108, 109 and 110 transmit DAO messages to the root node 101 if they want to install a path to themselves in the routing table of the network.

Upon joining the DODAG a node will determine its own rank based on the rank advertised in the DIO message received from the parent node. In the known routing protocol RPL, if a node receives DIOs from multiple neighbouring nodes the node will select a parent from the neighbouring nodes based on the node through which its resulting rank is the smallest.

Once a node has joined the DODAG it has a communication path to the root node via its parent node. Since a node only requires information about its parent to communicate with the root node, RTL requires very little information to communicate data. This characteristic is particularly advantageous for devices which are constrained in terms of processor and memory.

In step 304, the newly joined nodes (102, 108, 109 and 110) periodically broadcast DIO messages to enable neighbouring nodes which were not within the root node's range to join the sensor network. The DIO messages transmitted by the recently joined nodes (102, 108, 109 and 110) will not have the same contents as the DIO message transmitted by the root node in step 301. Since the recently joined nodes (102, 108, 109 and 110) are one hop removed from the root node 101 in the routing topology, the rank will need to be adjusted accordingly. In the simplified network topology shown in FIG. 1 the rank is incremented by one.

In RPL it is also possible to solicit DIO messages from neighbouring nodes that are already part of the DODAG. In step 305, nodes that are not part of the network transmit DIS messages. Any neighbouring station that receives a DIS message will transmit a DIO message, thereby enabling neighbouring nodes to join the DODAG.

As discussed above, particularly in relation to step 302, the rank of a node is used in the known routing protocol RPL in order to select a parent node and therefore form the routing topology. The rank represents an abstract distance to the root of the DODAG and is exchanged between nodes in order to avoid loops in the routing topology.

When a node joins a network in RPL its rank is calculated according to an objective function. Examples of prior art objective functions include Minimum Rank Objective Function (MRHOF) and Objective Function Zero (OF0). Objective Function Zero (OF0) is discussed in more detail in the Internet Engineering Task Force (IETF) Request for Comments 6552 which is incorporated herein by reference, however to summarise, the rank of a node, Rank(node), according to Objective Function Zero (OF0) is calculated by:

$$\text{Rank(node)} = \text{Rank(Parent)} + \text{Rank}_{increase} \quad (1)$$

$$\text{Rank}_{increase} = (Rf \times Sp + Sr) \times \text{MinHopRankIncrease} \quad (2)$$

Where:
- Rank(Parent) is the rank of the parent node according to the received DIO message;
- Rf is a configurable value known as the rank factor which is used to multiply the effect of the link property parameter on the rank increase computation;
- Sp is a computed value that is based on the link properties (i.e. the connection quality) with a neighbouring node and is known as the step of rank;
- Sr is a configurable value known as the stretch of rank and indicates a maximum augmentation to the step of rank. In common practice the stretch of rank is set to one; and
- MinHopRankIncrease is a constant value corresponding to the minimum rank increase imposed for a hop in the DODAG.

As an example of the values used in equation 2, the MinHopRankIncrease could equal 100 and the product of W and L could equal 0.1 if the link is reliable and 0.3 if the link is lossy.

The criterion used for selecting a parent node varies depending on the objective function that is chosen. Despite this there are common trends amongst objective functions, namely; the greater the number of hops in a network (i.e. the number of intermediary nodes that need to be traversed to reach the root node) the higher the rank and consequently the less likely it will be that the node transmitting the DIO message will be selected as the parent node.

Determining a routing topology using an objective function such as OF0 strikes a balance between the link property metric (i.e. the quality of the wireless link to the potential parent node) and the hop count (i.e. the number of nodes between the potential parent node and the root node). As a result, in RPL, a shorter path comprising a smaller number of hops with poorer link property metrics will generally be preferred over a longer path with a greater number of hops between nodes with better link property metrics.

This inclination to favour paths comprising fewer hops is used in most Low-power and Lossy Networks when forming a routing topology as it advantageous in situations where a common wireless channel is used for the entire network. This approach is generally preferred since having more hops in a routing topology results in more contention for the radio resources and a greater chance of intra-network interference. As a result of the increased contention the sensor network could be less reliable and could suffer from increased latency as the number of nodes in the network grows.

Unlike other Low-power and Lossy Networks, in time synchronized networks, in particular IETF 6TiSCH (IPv6 over IEEE 802.15.4e TSCH mode); communications can be scheduled and coordinated in a non-conflicting manner.

Figure 4:
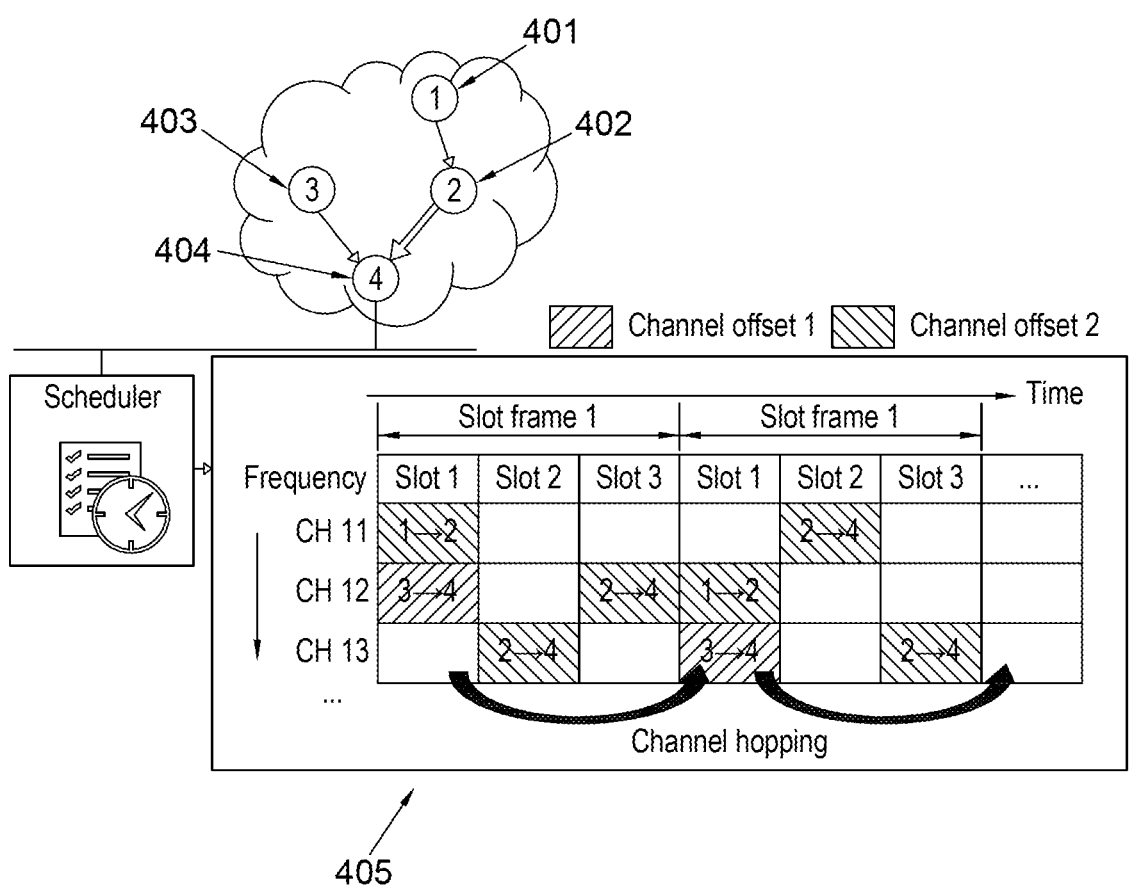
FIG. 4 shows an exemplary schedule for a 6TiSCH network.

FIG. 4 shows an exemplary schedule for a 6TiSCH network. FIG. 4 shows a leaf node 401 which has a communication link with its parent node, node 402. Node 402 is also the child of the root node 404. Root node 404 is also the parent of leaf node 403.

The nodes, in an IEEE 802.15.4 network consume communication resources according to a Time Division Multiple Access (TDMA) schedule where a timeslot in the schedule defines a unit of bandwidth that is allocated for communication between neighbouring nodes. In IEEE 802.15.4e the available spectrum is also divided into multiple channels. As a result the scheduler can assign both time and channel resources for communication between neighbouring nodes.

The Time-Slotted Channel Hopping (TSCH) mode of IEEE 802.15.4e was designed to enable IEEE 802.15.4 devices to support a wider range of applications including, but not limited to, industrial applications. At its core is a medium access technique that uses time synchronization to achieve low-power operation and uses channel hopping to achieve high reliability.

By using time synchronised transmitters that are configured to transmit over independent frequency channels it is possible to schedule transmissions from different sensor nodes in a non-conflicting manner. This can be seen in the schedule 405 of FIG. 4 which shows transmissions from node 1, 401, to node 2, 402 as well as node 3, 403 to node 4, 404, being scheduled at the same time (Slot frame 1, Slot 1) using different frequency channels (i.e. CH11 & CH12).

In light of the scheduling approach adopted in IEEE 802.15.4e it is possible to efficiently schedule and coordinate communications in a non-conflicting manner. Consequently, many of the over-riding objectives that were used in the design of RPL are no longer applicable, namely the desire to reduce the number of hops in order to reduce channel contention.

As a result a different approach to determining a routing topology is subsequently disclosed which aims to create the most reliable routing topology given the scheduling approach used in IEEE 802.15.4e. The new routing protocol presented herein is named RECLAIM, standing for; Reliable and power Confined routing in Large-scale 6TiSCH Mesh networks.

RECLAIM is a multi-level power confined routing protocol based on RPL for time synchronized 6TiSCH networks. Unlike RPL, RECLAIM uses more than one power level during the joining process. While RPL aims to minimise the number of hops in a topology, RECLAIM aims to create the most reliable routing path. Consequently, a path formed of multiple high-reliability hops will generally be selected instead of a path containing a small number of low reliability hops.

Figure 5:
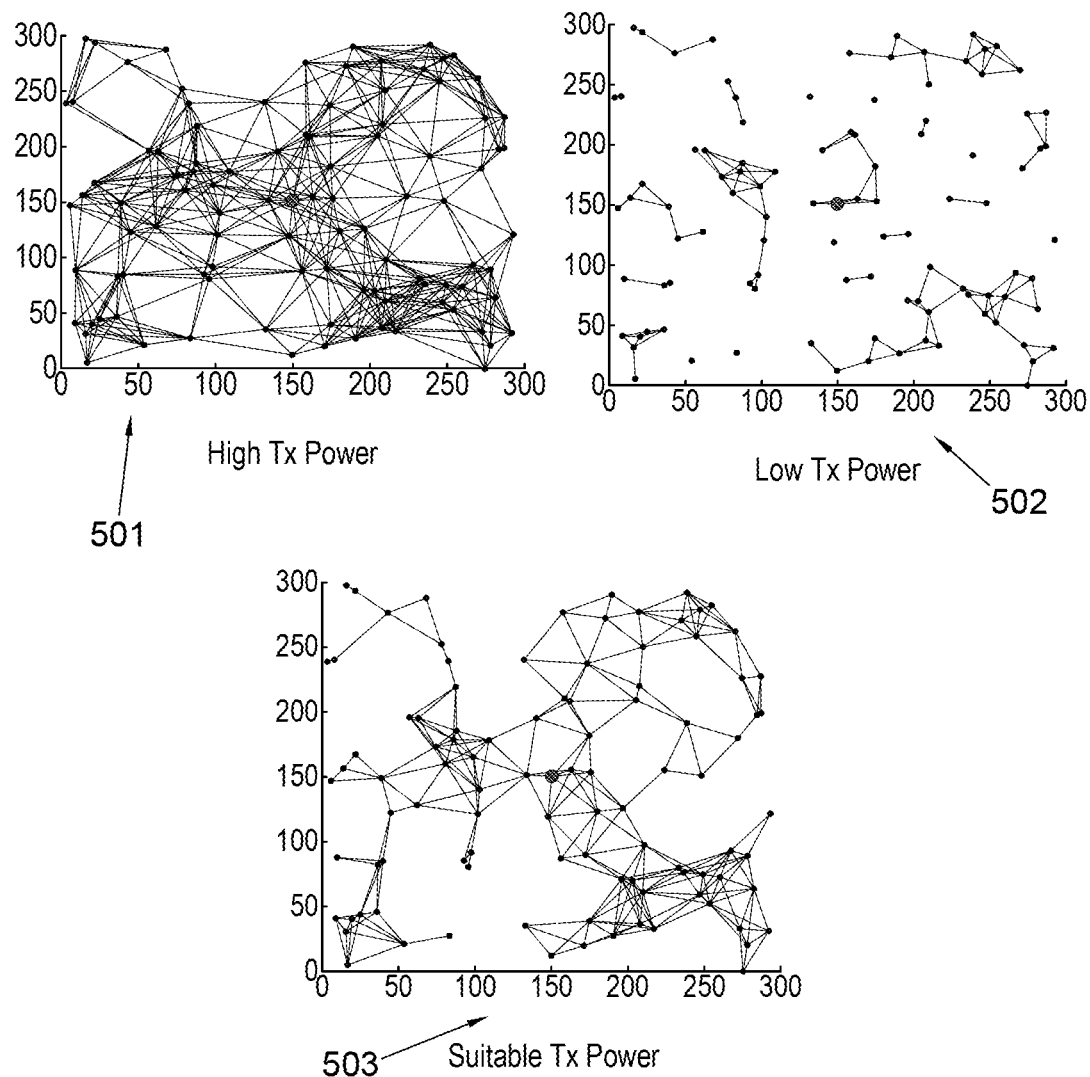
FIG. 5 shows three network topologies formed using different transmit powers for routing related messages.

FIG. 5 shows three network topologies formed using different transmit powers for routing related messages. FIG. 5 shows a network topology 501 formed using high power transmit signals, a network topology 502 formed using low power transmit signals and a network topology 503 formed using optimum signal power levels 503. As can be seen from FIG. 5, the resulting network topology depends on which nodes can receive DIO messages. The greater the transmit power; the greater the range of a sensor nodes' DIO message. This effect can be seen in topology 501 which shows multiple interconnections amongst multiple different nodes. In contrast topology 502 shows a topology containing a number of broken paths that results from transmitting signals with insufficient signal power.

By using more than one power level during the joining process, RECLAIM preferentially selects lower power communication links which are generally more reliable due to their increased tolerance to noise and interference.

While a plurality of different power levels are used when joining a network and determining the routing topology, a single predefined transmission power level is used for all other communication including scheduling, data communication and other non-routing related signalling. In an embodiment the maximum power level is used for all non-routing related communication.

Two transmission power levels are used in the example discussed below for simplicity however, for the avoidance of doubt it is emphasised that more than two power levels could equally be used in other embodiments.

As discussed above, RPL use three main messages for forming a network and generating a routing topology: DIO, DAO and DIS messages. As a result RECLAIM using two power levels defines, a set of signalling messages $M_f$ (i.e.

$DIO_f$, $DAO_f$ and $DIS_f$) which are transmitted at a maximum allowed power level and a set of signalling messages $M_r$ (i.e. $DIO_r$, $DAO_r$, and $DIS_r$) which are transmitted at a reduced power level that is less than the maximum allowed power level.

In addition to using more than one transmit power level RECLAIM also defines a Priority Routing Index (PRI) that is added to the header of the signalling messages within sets $M_f$ & $M_r$. The value of the Priority Routing Index (PRI) is calculated by:

$$PRI(new) = PRI(received) + X \quad (3)$$

Where:

$$X = \begin{cases} 0 & \text{when } M_r \text{ is sent} \\ 1 & \text{when } M_f \text{ is sent} \end{cases} \quad (4)$$

Equation 4 shows an example of different X values for different transmit power levels. Although 0 and 1 are used as the two increments, it will be appreciated that the value of the increments could take any value provided they are greater than zero.

In the case where more than two power levels are used for the signalling messages there can be more than two possible values for X. In an embodiment there are as many possible values of X as there are transmit power levels. In general the value of X will increase with the transmit power level of the message such that a high power DIO message will have a higher PRI value than a low power DIO message transmitted by the same node. Equation 5 shows an arbitrary selection of increments for a routing methodology where there are N transmit power levels.

$$X = \begin{cases} 0 & \text{when } M_0 \text{ is sent} \\ 1 & \text{when } M_1 \text{ is sent} \\ \vdots & \vdots \\ N & \text{when } M_N \text{ is sent} \end{cases} \quad (5)$$

In keeping with Equation 4, Equation 5 shows an arbitrary selection of X values however for the avoidance of doubt it is emphasized that each value of X could take any value provided it is larger than zero.

Figure 6:
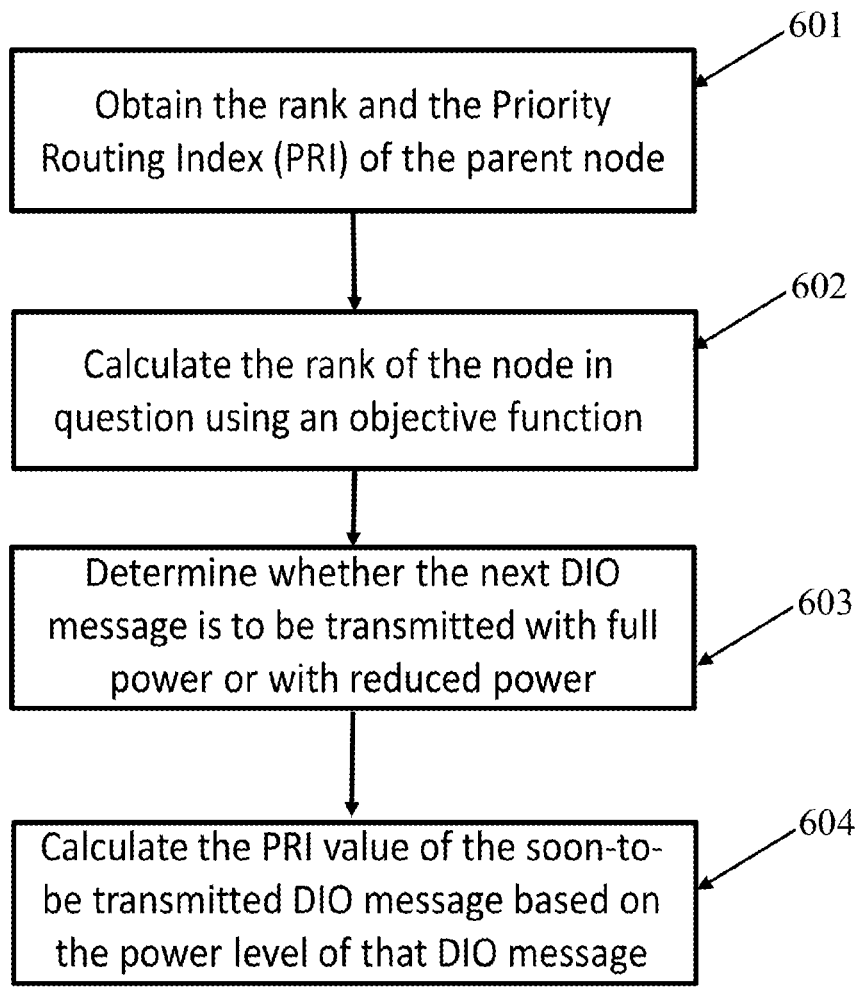
FIG. 6 shows a method of generating a DIO message according to an embodiment.

FIG. 6 shows a method of generating a DIO message according to an embodiment. The method begins in step 601 by obtaining the rank and the Priority Routing Index (PRI) of the parent node. This information could be obtained by recalling the contents of the parent nodes' DIO message. In step 602 the method calculates the rank of the node in question using an objective function (e.g. Objection Function zero, OF0).

In step 603, the method determines whether the next DIO message is to be transmitted with full power (i.e. $DIO_f$) or with reduced power (i.e. $DIO_r$). During the formation of the network routing related signals will be transmitted at more than one of the possible power levels, or preferably, at each of the possible power levels. In one embodiment routing related messages are alternately transmitted with the different power levels. In a further embodiment a reduced power message, $M_r$, is transmitted by a node before a full power message, $M_f$, is transmitted.

In step 604, the PRI value of the soon to be transmitted DIO message will be generated in accordance with equations 3 and 4 based on the power level that the DIO message will be transmitted with.

In order to select a parent node RECLAIM uses both the Priority Routing Index (PRI) and the rank. Where a node receives DIO messages from multiple neighbouring nodes, the node with the smallest PRI value will be selected as the parent node. The rank is used as a secondary differentiator in situations where two or more neighbouring nodes have the same PRI value. Where two or more neighbouring nodes have the same PRI value the parent node is selected based on the neighbouring node which minimises the resulting rank of the sensor node.

By primarily selecting a parent node based on the received PRI value, the routing protocol disclosed herein favours a greater number of small distance hops since the lower power DIO messages have lower PRI values. As the distance to a neighbouring node increases there is a point where the link can no longer successfully support a low power DIO message and a node is only able to receive a full power message. While a communication link with this node is still possible at maximum power a closer neighbour will preferably be selected in order to increase reliability and minimise the adverse effects of using long distance communication such as attenuation, multipath and fading.

In an embodiment, nodes which receive routing related messages (e.g. a DIO message) will respond by transmitting routing related messages (e.g. a DAO message) at the same power level as the received routing related message. In order to achieve reciprocal transmit powers the received routing related message (i.e. the DIO message) includes an additional indication in the header of the message which contains the per hop PRI value, i.e. the value of the increment X from equation 4 or 5.

Figure 7:
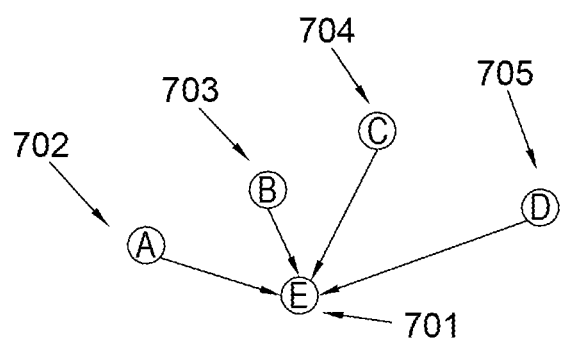
FIG. 7 shows an exemplary network topology according to an embodiment.

FIG. 7 shows an exemplary network topology according to an embodiment. FIG. 7 shows a network where node E, 701, receives a DIO message from each of its neighbouring nodes; nodes A, B, C and D (702, 703, 704 and 705). Table 706 shows the Priority Routing Index (PRI) received in the DIO messages from the neighbouring nodes (702, 703, 704, 705) and the rank that would result if the corresponding neighbouring node was selected as the parent node for Node E, 701.

In FIG. 7, node A, 702, and node B, 703, are the favoured candidate parent nodes since they both have the joint smallest PRI value. Node D, 705, is the next preferred parent node followed lastly by node C 704 which has the highest PRI value and consequently is the least preferential for selection as the parent node. In the example shown in FIG. 7 both node A, 702, and node B, 703, have the same PRI value. As a result selection between Node A, 702, and node B 703, is based on the node which minimises the rank of node E, 701. Since the resulting rank of node A, 702, is lower rank than the resulting rank of node B, 703; node A is selected as the parent node.

Figure 8:
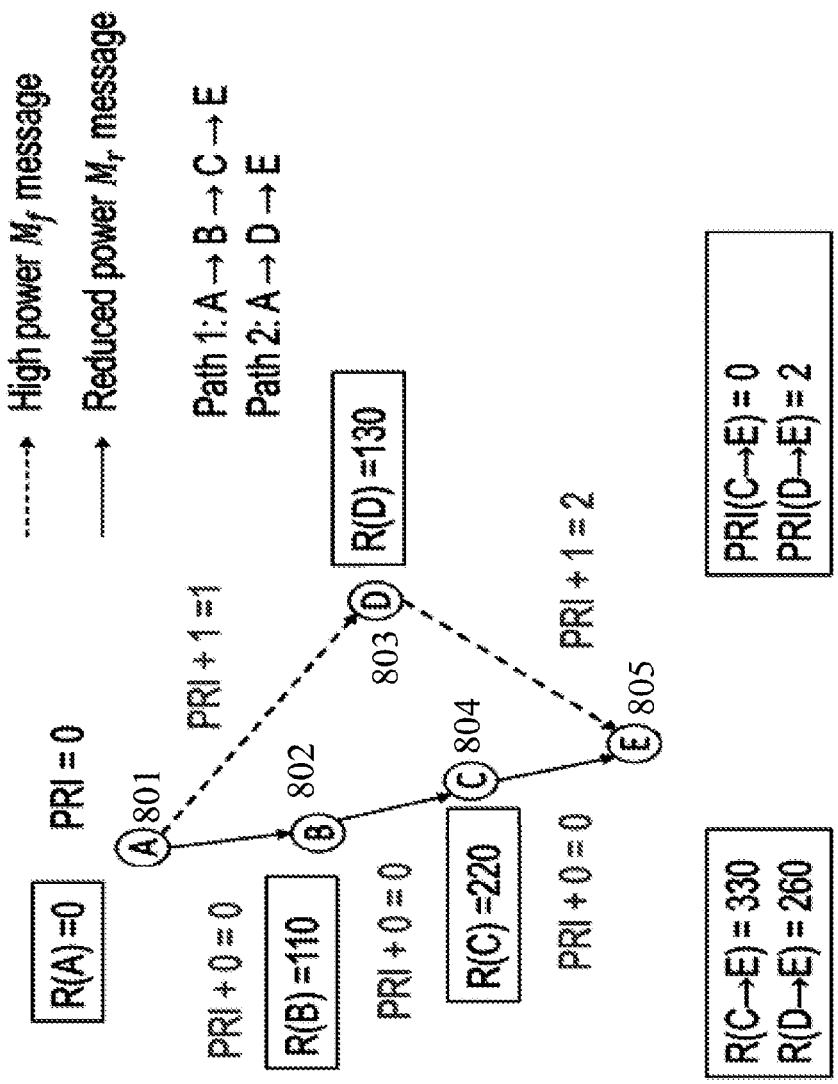
FIG. 8 shows an annotated example of parent node selection according to one embodiment.

FIG. 8 shows an annotated example of parent node selection according to one embodiment. In FIG. 8 node A, 801, is the root node and node E, 805, receives a DIO message from Node C, 804, and node D, 803.

In order to determine the routing topology it is firstly necessary to consider the PRI values in the received DIO messages and secondly, if required, the rank that would result by selecting either of the neighbouring nodes as the parent node.

In FIG. 8 a solid arrow represents a communication link through which a reduced power message from the $M_r$ set of messages can be received and a dashed line represents a communication link through which only a high power message from the $M_f$ set of messages can be received.

Path 1 comprises a route from node A, 801, to node B, 802, to node C, 804, to node E, 805. Since path 1 can be traversed using only reduced power messages the PRI value, calculated in accordance with equations 3 & 4 and contained within the DIO message transmitted by node C, 804, is 0 since each hop of path 1 adds zero to the received PRI value.

Path 2 is formed of two links through which only high power messages $M_f$ can be received. This could be due to any number of reasons including there being a large distance between nodes A, D and E (801, 803, 805). Since path 2 can only be traversed using full power messages the PRI value contained within the DIO packet transmitted by node D, 803, is 2.

In accordance with the method of parent node selection discussed above; Node C, 804 is selected as the parent node for node E, 805, since the PRI value in the DIO message from node C, 804, is lower than the PRI value received from node D, 803.

FIG. 8 also shows the calculation of the rank value that results for each of the respective paths. In the example of FIG. 8 a MinHopRankIncrease of 100 is assumed and W*L is set to 0.1 if the link is reliable and 0.3 if the link is lossy. Since RPL promotes paths with fewer hops to the root node, the rank calculated at node E, 805, for path 2 is lower than the rank calculated for path 1. As a result, rank based routing as proposed in RPL would not result in the most reliable communication path being selected (i.e. path 1).

The example of parent node selection shown in FIG. 8 demonstrates how the routing protocol discussed herein preferentially selects short distance, generally more reliable, paths to the root node instead of long distance, generally less reliable, communication paths.

Figure 9:
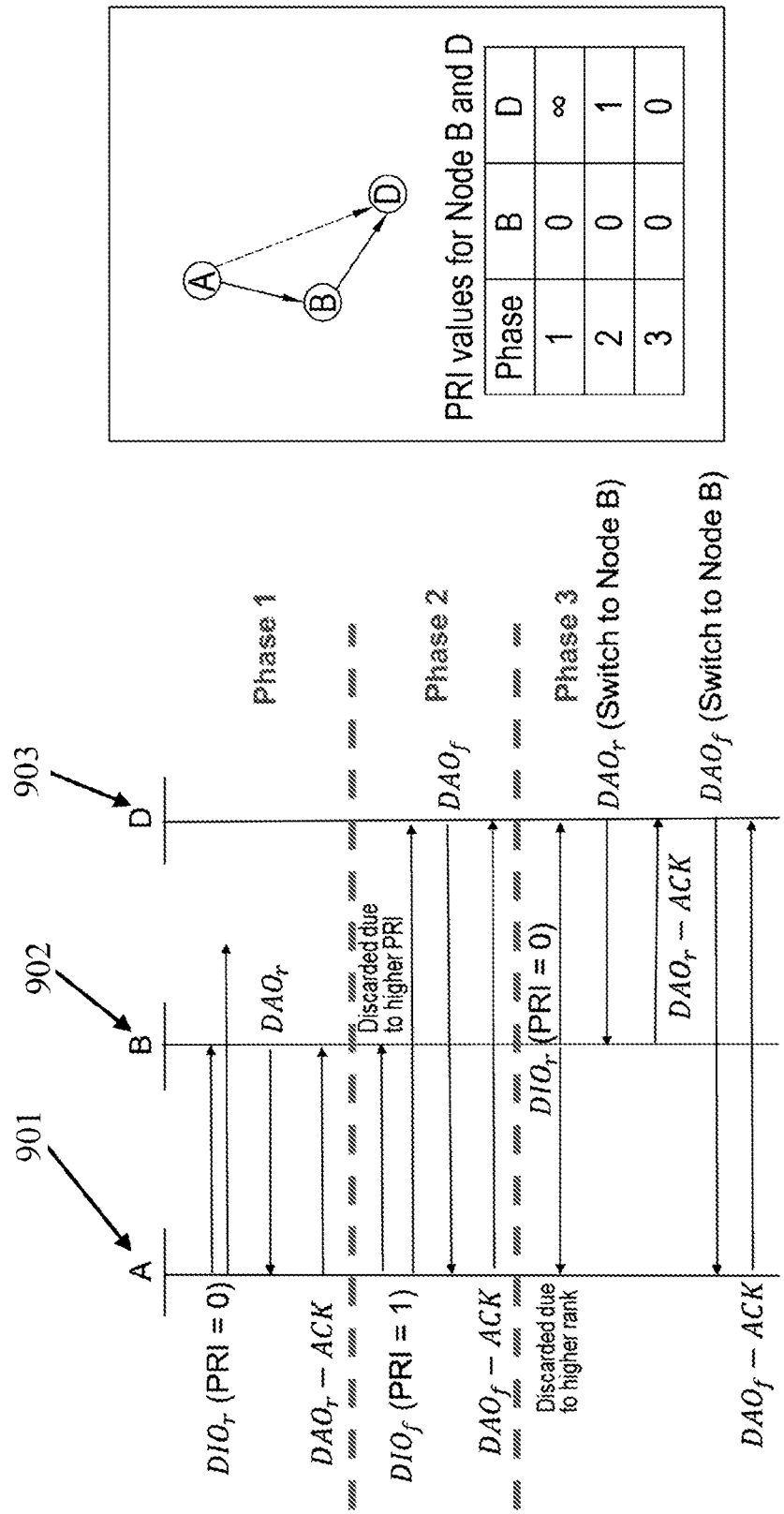
FIG. 9 shows an exchange of routing messages according to one embodiment.

FIG. 9 shows an exchange of routing messages according to one embodiment. In FIG. 9 Node A, 901, is the root node. In phase 1 of FIG. 9 node A, 901, transmits a $DIO_r$ message (i.e. a DIO message at a reduced power level). This message is received by Node B, 902, but is not received by node D, 903, due to the lossy link between Node A and Node D. Node B, 902, subsequently transmits a DAO message at a reduced power level (i.e. $DAO_r$) in order to inform Node A, 901, that it has been selected as a parent node. In accordance with the 6TiSCH standard and as detailed in the Internet Engineering Task Force (IETF) Request for Comments: 6550 which is incorporated herein by reference, it is possible to request acknowledgement on receipt of a DAO message by setting a flag in the DAO message itself. As a result, after receiving a $DAO_r$ message from node B, 902, node A, 901, transmits an acknowledgment message (i.e. $DAO_r$-ACK).

As previously discussed, in selected embodiments each node transmits a reduced power message (i.e. $DIO_r$) as well as a full power message (i.e. $DIO_f$). Phase 2 of the exchange shown in FIG. 9 begins with Node A, 901, transmitting a full power DIO message (i.e. $DIO_f$). Due to the increased transmit power node D, 903, is now able to receive the DIO message from node A, 901. After receiving the DIO message from node A, node D subsequently transmits a DAO message at full power (i.e. $DAO_f$) and an acknowledgement is subsequently issued by Node A, 901 (i.e. $DIO_f$-ACK).

In Phase B the full power message, $DIO_f$, transmitted by node A, 901, is also received at node B, 902 however the PRI value of the $DIO_f$ message is one greater than the PRI value in the reduced power $DIO_r$ message (i.e. PRI=1). As a result Node B, 902, does not act on the $DIO_f$ transmitted by node A, 901, since it already has a parent node with a lower PRI value.

Phase 3 of FIG. 9 begins by Node B, 902, broadcasting a reduced power DIO message (i.e. $DIO_r$) to its neighbouring nodes. This message is received by Node A, 901, and Node D, 903. Since the DIO message transmitted by node B, 902, has a lower PRI value (PRI=0) than its current parent (Node A with a $DIO_f$ message, i.e. PRI=1), Node D will select Node B, 902, as its parent.

In an embodiment the method of determining a routing topology does not assume symmetric link properties between the two communicating parties. As a result, in order to form a communication link a complete three way handshake comprising DIO, DAO and DAO-ACK messages must be completed before a communication link is established. If for example, in Phase 3 of FIG. 9, a $DAO_r$-ACK message had not been received, then the connection process between Node D, 903 and Node B, 902, fails and Node D, 903, would still maintain Node A, 901, as its parent node.

After the routing topology has been formed subsequent data and communication messages are transmitted using the full available power in an embodiment.

Figure 10:
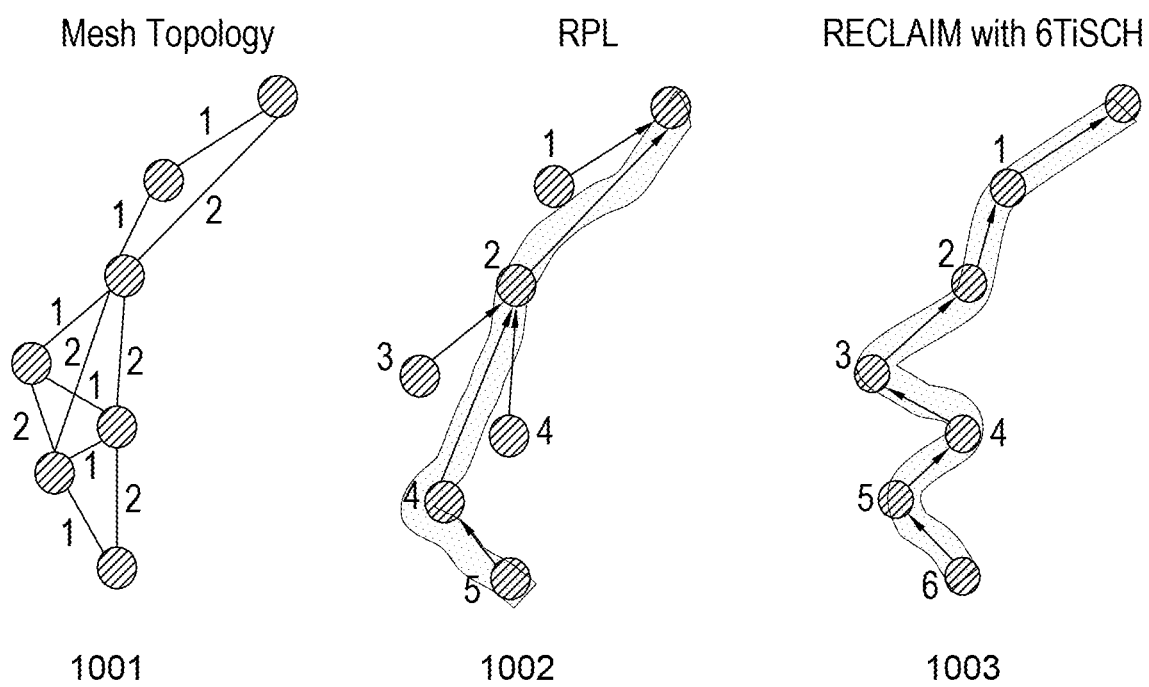
FIG. 10 shows a graphical comparison of the routing topologies obtained for an arbitrary mesh network.

FIG. 10 shows a graphical comparison of the routing topologies obtained for an arbitrary mesh network. FIG. 10 shows a mesh topology 1001 comprising various nodes wherein a number of different communication links exist between nodes. The topology 1002 is formed using an RPL based routing protocol where the parent/child relationships are formed based on links which reduce the number of hops to the root node. In contrast, the routing topology 1003 is formed using the methods disclosed above which aim to encourage more reliable, shorter distance hops between a node and the root node.

In order to establish the reliability of the routing method described above, the proposed routing protocol RECLAIM was simulated and compared with the prior art routing method RPL using the following 6TiSCH configurations:

*RMJ*=RECLAIM(for routing)+JUDDER(for scheduling)

*RJ*=RPL(for routing)+JUDDER(for scheduling)

*RD*=RPL(for routing)+DeTAS(for scheduling)

Where JUDDER is a 6TiSCH scheduling methodology which aims to reduce packet loss due to memory overflows as described in U.S. non-provision patent application Ser. No. 15/816,662 and DeTAS is a scheduling methodology as described in N. Accettura et al. "Decentralized Traffic Aware Scheduling in 6TiSCH Networks: Design and Experimental Evaluation," in IEEE Internet of Things Journal, vol. 2, no. 6, pp. 455-470, December 2015, each of which are incorporated herein by reference.

In the following simulations a 1000 node network is simulated over the course of a month where each node sends a packet per simulation iteration. In these simulations the overprovision cell number is also set to one. As discussed in "IETF 6TiSCH 6top Scheduling Function Zero (SF0)" which is incorporated herein by reference; overprovisioning is the action and effect of increasing a value representing an amount of resources in order to reduce the effect of traffic variability on packet loss.

Figure 11:
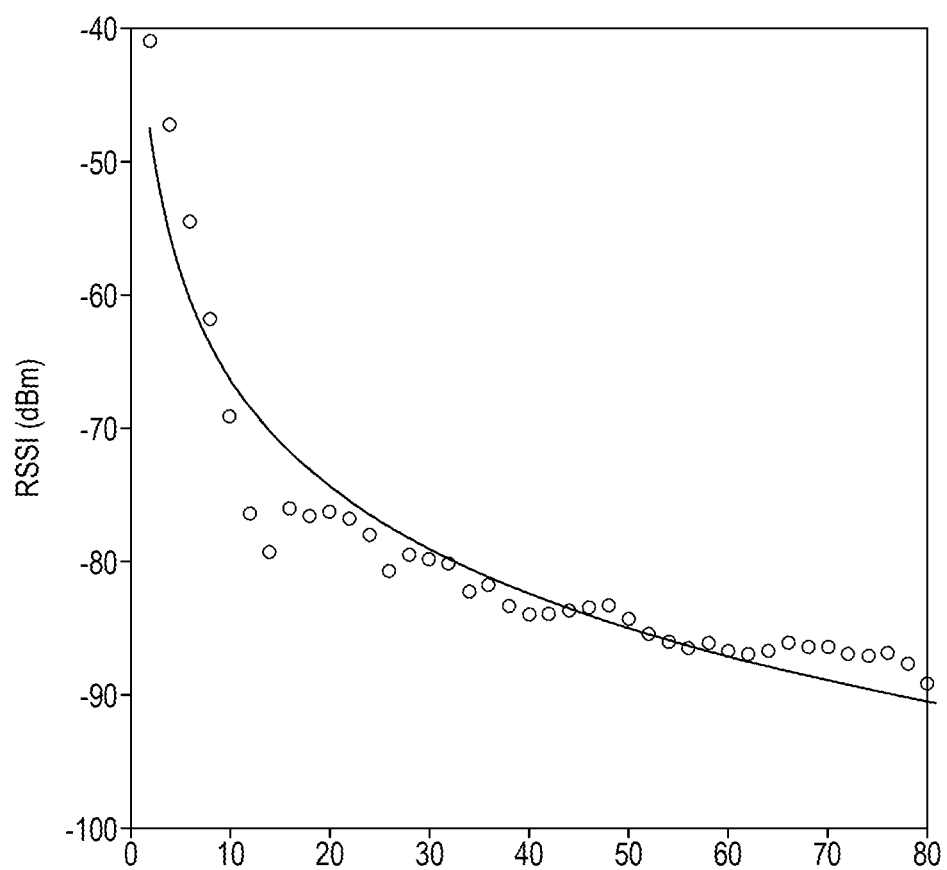
FIG. 11 shows a channel model used for simulating the various routing protocols.

FIG. 11 shows a channel model used for simulating the various routing protocols.

Figure 12A:
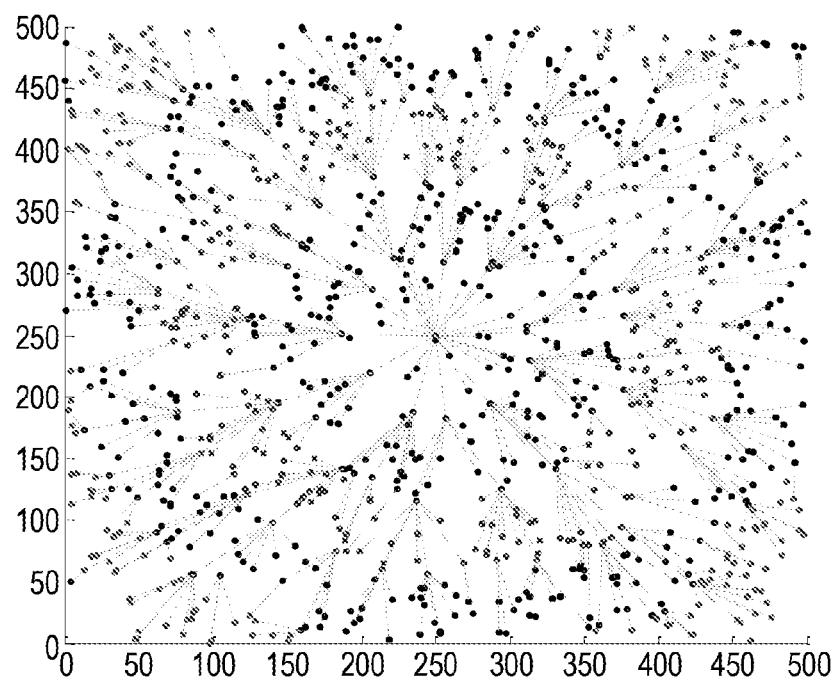
FIG. 12A shows a simulated routing topology generated using RPL and JUDDER.

FIG. 12A shows a simulated routing topology generated using RPL and JUDDER. In the network topology of FIG. 12A the maximum number of hops to reach the root node is 7 and the total number of scheduled communications is 6972 resource cells, with each resource cell representing a unit of bandwidth that is allocated for a time slot as shown in FIG. 4.

Figure 12B:
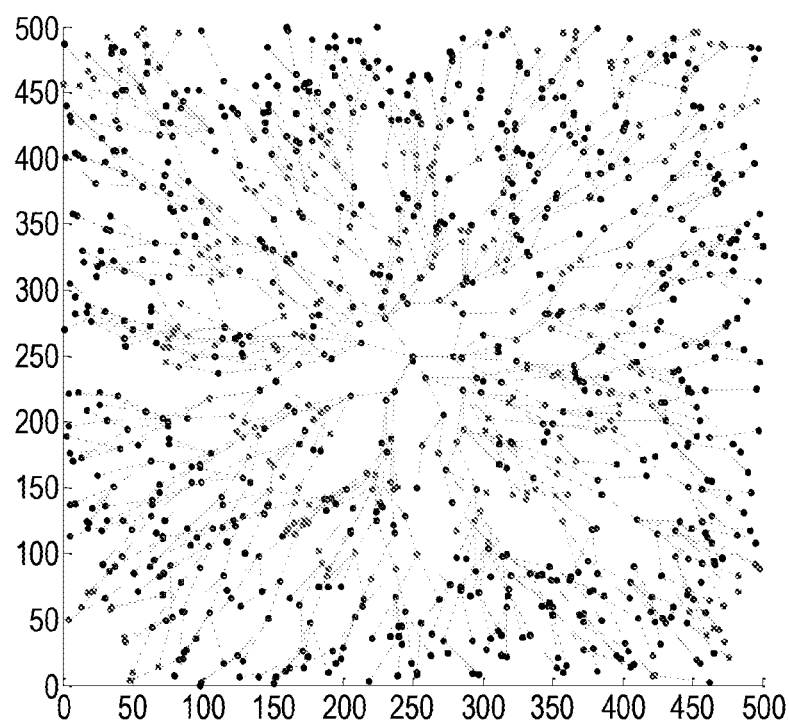
FIG. 12B shows a simulated routing topology generated using RECLAIM and JUDDER.

FIG. 12B shows a simulated routing topology generated using RECLAIM and JUDDER. In the network topology shown in FIG. 12B the maximum number of hops to reach the root node is 14 and the total number of scheduled communications is 13068 resource cells. While RECLAIM and JUDDER require a larger number of resource cells for scheduled communication (13068 as oppose to 6972) there is only 8 timeslots difference (i.e. 80 ms) between the schedule length of RPL+JUDDER and RECLAIM+JUDDER since the 6TiSCH scheduling algorithm is able to schedule parallel communication without causing interference as previously shown in FIG. 4.

Figure 13A:
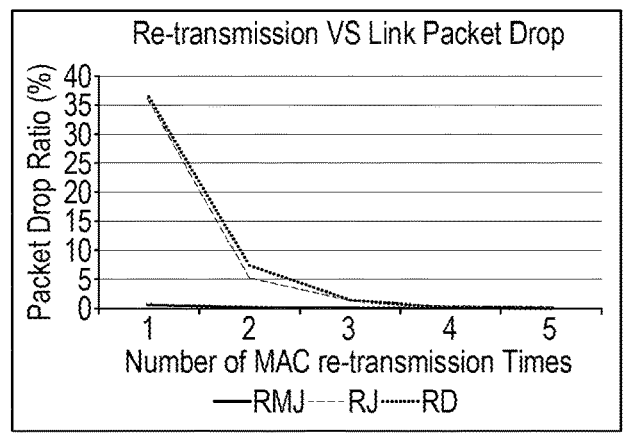
FIG. 13A shows a packet drop ratio for each simulated configuration.

FIG. 13A shows a packet drop ratio for each simulated configuration. FIG. 13A shows that as the number of retransmissions of failed packets increases, the overall number of packets being dropped decreases in all cases. While retransmission may be necessary to communicate a packet it also introduces significant delays and increases the amount of network traffic. In contrast to RPL based configurations, the routing topology created using RECLAIM shown as 'RMJ' in FIG. 13A is able to achieve a packet drop rate of less than 0.01% using only 2 MAC retransmissions. This is achieved by RECLAIM selecting a routing topology which promotes short, high reliability, communication links thereby minimising the end-to-end packet drop ratio.

Figure 13B:
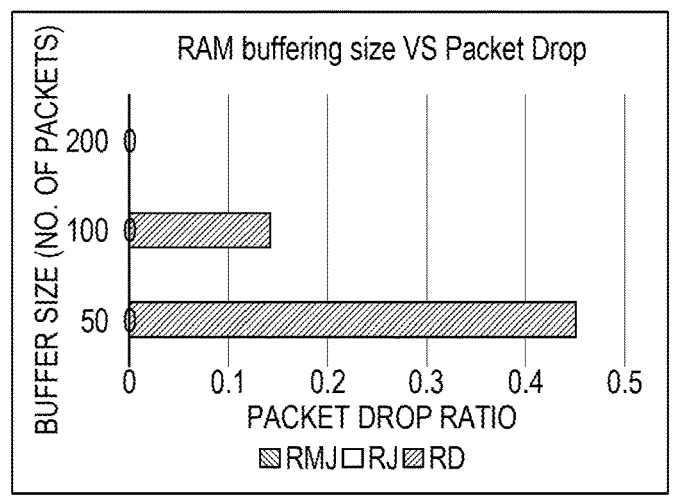
FIG. 13B shows the packet drop rate versus ram buffering size for each simulated configuration.

FIG. 13B shows the packet drop rate versus ram buffering size for each simulated configuration. FIG. 13B shows the number of packets that are dropped because of memory overflows on intermediary (or relay) nodes. For each configuration that uses JUDDER (i.e. RMJ and RJ) there are no dropped packets, while configurations which use DeTAS (i.e. RD) have a packet drop rate of 45% when the buffer size is set to 50 packets and 14% when the buffer size is set to 100 packets.

Figure 13C:
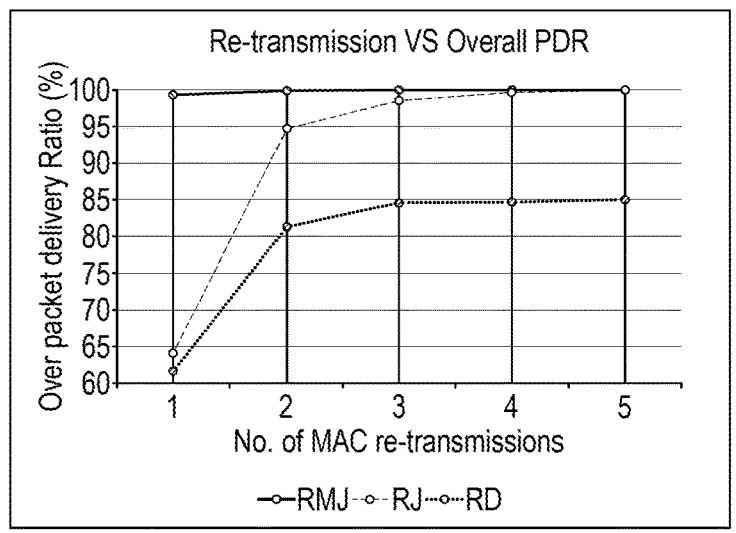
FIG. 13C shows the number of packet retransmissions versus the overall packet delivery ratio for each simulated configuration.

FIG. 13C shows the number of packet retransmissions versus the overall packet delivery ratio for each simulated configuration. FIG. 13C shows that RMJ (i.e the combination of RECLAIM and JUDDER) is able to achieve a very high level of reliability. FIG. 13C shows that RMJ drops 100 times fewer packets compared to RJ (i.e. RPL and JUDDER) and RD (i.e. RPL and DeTAS), with the packet delivery ratio for RMJ (i.e. RPL and JUDDER) being 99.9999% when the re-transmission time is set to 3, and 99.99999% when the retransmission time is set to 4.

The routing methodology disclosed herein has a number of advantages, not least that RECLAIM is a reactive distributed routing algorithm wherein the primary objective is to minimise the end-to-end loss rate. RECLAIM can also be easily implemented based on the existing RPL protocol thereby enabling integration into the 6TiSCH standard. Furthermore RECLAIM does not require information about the geographical distance between nodes in order to form a routing topology, rather it utilizes both PRI and RPL ranking to avoid communication loops.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of selecting a parent node for routing from among communication apparatuses corresponding to nodes in a network, the method comprising:
   transmitting, by a first communication apparatus corresponding to a first node, a first routing message comprising a first priority routing index, at a first power level of a plurality of different power levels associated with different increments, the first priority routing index being calculated by using a first increment associated with the first power level and a priority routing index of a parent node of the first node;
   transmitting, by a second communication apparatus corresponding to a second node, a second routing message comprising a second priority routing index, at a second power level of the plurality of power levels, the second priority routing index being calculated by using a second increment associated with the second power level and a priority routing index of a parent node of the second node;
   receiving, by a third communication apparatus corresponding to a deciding node, the first routing message and the second routing message; and
   selecting, by the third communication apparatus, the first node or the second node, as the parent node, in accordance with the first priority routing index included in the first routing message and the second priority routing index included in the second routing message.

2. A method of selecting a parent node from communication apparatuses corresponding to nodes in a network, the method comprising:
   receiving a first routing message comprising a first priority routing index from a first communication apparatus corresponding to a first node, the first priority routing index being calculated by using a first increment associated with a fir power level and a priority routing index of a parent node of the first node, wherein different increments are associated with different power levels, and the first power level is a power level selected from the power levels to transmit the first routine message;
   receiving a second routing message comprising a second priority routing index from a second communication apparatus corresponding to a second node, the second priority routing index being calculated by using a second increment associated with a second power level and a priority routing index of a parent node of the second node, wherein the second power level is a power level selected from the power levels to transmit the second routing message; and
   selecting the first node or the second node, as the parent node, in accordance with the first priority routing index included in the first routing message and the second priority routing index included in the second routing message.

3. The method according to claim 2, wherein the selecting of the first node or the second node as the parent node further comprises:
   comparing the first priority routing index and the second priority routing index; and
   selecting, as the parent node, the first node when the first priority routing index is lower than the second priority routing index, and the second node when the second priority routing index is lower than the first priority routing index, wherein the first priority routing index and the second priority routing index indicate a number of high power hops in a transmission path to a root node.

4. The method in accordance with claim 3, wherein the selecting of the first node or the second node as the parent node further comprises selecting the first node or the second node, as the parent node, based on a RPL rank, when the first priority routing index is equal to the second priority routing index.

5. The method in accordance with claim 3, further comprising transmitting a non-routing related message to the parent node at a maximum allowed power level irrespective of the power of a received routing message.

6. The method according to claim 2, wherein the first priority routing index is calculated by adding the first increment to the priority routing index of the parent node of the first node.

7. A method of transmitting a routing message in a network, the method comprising:
  transmitting a routing message at each power level of a plurality of different power levels associated with different increments, wherein transmitting the routing message at each power level of the plurality of power levels comprises:
  selecting a power level from the plurality of power levels;
  calculating a priority routing index by using an increment associated with the selected power level and a priority routing index of a parent node; and
  transmitting the routing message comprising the calculated priority routing index at the selected power level.

8. The method in accordance with claim 7, wherein the transmitting the routing message at each power level of the plurality of power levels further comprises transmitting the routing message in order of increasing power level.

9. A non-transitory computer-readable medium comprising computer program instructions suitable for execution by a processor, the instructions configured to, when executed by the processor, perform the method according to claim 2.

10. A non-transitory computer-readable medium comprising computer program instructions suitable for execution by a processor, the instructions configured to, when executed by the processor, perform the method according to claim 7.

* * * * *